United States Patent
Wilsher et al.

(10) Patent No.: US 6,927,855 B2
(45) Date of Patent: Aug. 9, 2005

(54) METHOD OF DETERMINING AN IMAGE RECORDING DEVICE CHARACTERIZATION

(75) Inventors: Michael John Wilsher, Hertfordshire (GB); Martin Philip Gouch, Herrfordshire (GB)

(73) Assignee: Fujifilm Electronic Imaging Limited, Hertfordshire (GB)

( * ) Notice: Subject to any disclaimer, the term of this patent is extended or adjusted under 35 U.S.C. 154(b) by 280 days.

(21) Appl. No.: 10/429,473

(22) Filed: May 1, 2003

(65) Prior Publication Data

US 2004/0218183 A1 Nov. 4, 2004

(51) Int. Cl.$^7$ .................................................. G01J 3/46
(52) U.S. Cl. .................. 356/402; 356/419; 348/210.99; 382/162
(58) Field of Search ................................ 209/580, 587; 356/402, 408, 416, 419; 382/162, 167; 348/33, 210.99, 223.1, 224.1, 263, 266, 273

(56) References Cited

U.S. PATENT DOCUMENTS 5,668,596 A * 9/1997 Vogel ...................... 348/222.1

* cited by examiner

Primary Examiner—Gregory J. Toatley, Jr.
Assistant Examiner—Roy M. Punnoose
(74) Attorney, Agent, or Firm—Sughrue Mion, PLLC

(57) ABSTRACT

A method is provided of determining an image recording device characterisation for a target image. A number of component spectra are determined from a set of target spectra obtained from the target image such that the spectra can be represented by combinations of one or more of the component spectra. A perceptual color space data set is defined and combinations of the component spectra which correspond to the perceptual color space data set are determined. A device data set is generated in accordance with the determined combinations and a device spectra response, the device data set representing a set of colors which can be generated by an image recording device having the device spectral response. A characterisation is then determined by reference to the relationship between the device and perceptual color space data sets.

66 Claims, 11 Drawing Sheets

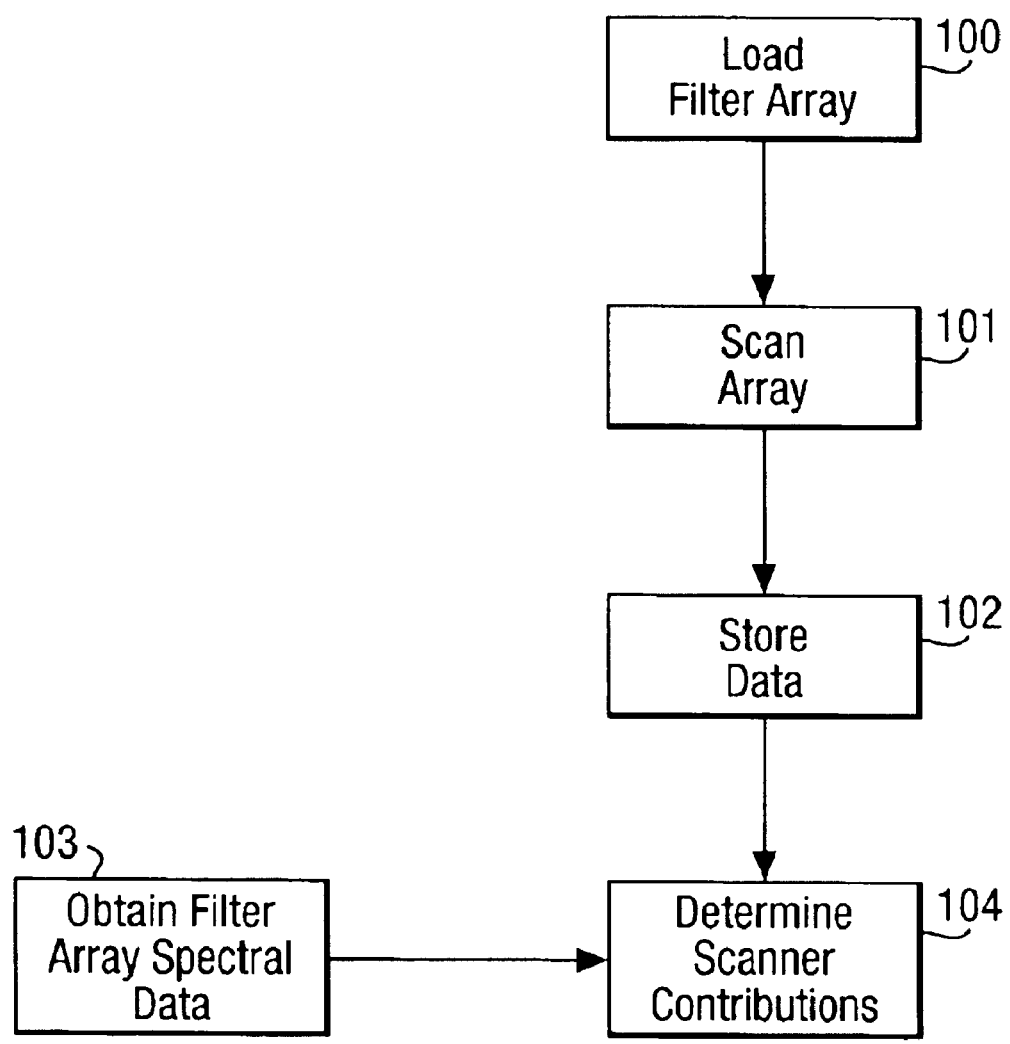

METHOD OF DETERMINING AN IMAGE RECORDING DEVICE CHARACTERIZATION

BACKGROUND OF THE INVENTION

The present invention relates to a method of determining an image recording device characterisation.

The use of image recording devices is well known to convert information upon an image into electronic form. Examples of these devices include scanners and digital cameras. Scanners are widespread in the photographic and image processing industries, in addition to being common in personal computing applications for domestic uses. Likewise, digital cameras are becoming increasingly popular for domestic use, in association with personal computers. It is important that such devices can accurately reproduce the information contained in an image, which in the case of a scanner is obtained from a scanned medium. This is a particular problem where the accurate reproduction of colours is required.

One problem is that the data representing uncorrected information from an image is generally not a colour accurate reproduction of the original scene or medium. There are various causes for these discrepancies and these are mainly produced by the image recording device apparatus itself such as by the light source, the device optics and the red, green and blue filters used in order to determine colour information. It is therefore common practice to generate a device "characterisation" which relates the colours within the image, which are device independent, to the colours as seen by the device (device dependent). Because of this, it is desirable to produce a characterisation for each device model, and preferably for each actual device produced, due to slight variations introduced into the apparatus during manufacture.

The device independent colours are normally represented in the form of X,Y,Z or L,A,B values whereas typically the colours scanned (device dependent) are represented as R,G,B values. These values are defined according to a standards body such as Commission Internationale de l'Eclairage (CIE).

In order to generate an accurate characterisation for a device, it is desirable to base this characterisation upon a wide range of device independent and dependent values. Therefore potentially all possible colours in the image which produce corresponding device independent data, can be accurately represented as appropriate device dependent data.

For scanners, such a characterisation can normally be achieved for many typical media using modern paint sets. However, in some instances a sufficient range of device independent values is not available and therefore it is not always possible to produce a suitable characterisation covering an appropriately broad range of X,Y,Z or L,A,B values. One particular example of this is in the reproduction of old paintings in which not only is the paint set no longer available, it may never have been accurately known and indeed the quality of the medium may have deteriorated over time.

In some instances it is therefore important to be able to produce accurate characterisations from a limited amount of data.

One method of achieving this is to perform a detailed analysis of spectra obtained from a medium such as an old painting. A paint set can then be physically generated and scanned in accordance with the standard practice for readily available paint sets. However, it will be appreciated that it is difficult and expensive to reproduce such paint sets, particularly as the corresponding dyes may no longer be available.

SUMMARY OF THE INVENTION

There is therefore a need to provide a method which avoids these disadvantages and yet provides the ability to generate a device characterisation upon limited device independent data.

In accordance with a first aspect of the present invention we provide a method of determining an image recording device characterisation for a target image, the method comprising:

determining a number of component spectra from a set of target spectra obtained from the target image, such that the target spectra can be represented by combinations of one or more of the component spectra;

defining a device data set representing a set of colours which can be generated by an image recording device, the device having a device spectral response;

determining combinations of the component spectra which, in accordance with the device spectral response, correspond to the device data set;

generating a perceptual colour space data set in accordance with the determined combinations of the component spectra; and, determining the characterisation by reference to a relationship between the device and perceptual colour space data sets.

In accordance with a second aspect of the present invention, we provide a method of determining an image recording device characterisation for a target image, the method comprising:

determining a number of component spectra from a set of target spectra obtained from the target image, such that the target spectra can be represented by combinations of one or more of the component spectra;

defining a perceptual colour space data set;

determining combinations of the component spectra which correspond to the perceptual colour space data set;

generating a device data set in accordance with the determined combinations of the component spectra and a device spectral response, the device data set representing a set of colours which can be generated by an image recording device having the device spectral response; and, determining the characterisation by reference to the relationship between the device and perceptual colour space data sets.

We have realised that by analysing a number of spectra from a target image, it is possible to determine one or more component spectra which, either alone or in combination, can be used to represent each of the spectra obtained from the target image. These can then be used in two main ways. Firstly, in accordance with the first aspect of the invention, the component spectra are used in conjunction with a defined device data set (such as for example R,G,B values), to generate a corresponding perceptual colour space data set (for example containing device independent X,Y,Z values).

Secondly, in accordance with the second aspect of the invention, the component spectra are used in conjunction with a defined perceptual colour space data set to generate a corresponding device data set.

In each case, account is taken of the effect of the device, in terms of a device spectral response such that the perceptual colour space data set reliably corresponds to the device data set.

The defining of one data set (device or perceptual colour space) and the generation of the other data set (perceptual colour space or device), then allows a device characterisation to be determined between these two data sets.

The present invention is therefore advantageous in that the generation of a physical paint set is not required as this is replaced by the combinations of component spectra. This significantly reduces the costs and time associated with generating the characterisation. These methods can also be applied in situations where a suitable paint set is no longer available, as is the case for old paintings.

The invention is applicable to image recording devices in which images are recorded electronically. These include scanners and cameras such as digital cameras. In most cases the "target image" is in fact obtained from a particular target medium such as an old painting.

The spectra from the target image are preferably obtained using apparatus such as a spectrophotometer. Generally a number of spectra are measured at different locations within the target image (such as at different locations upon a target medium).

The spectra obtained are then analysed to determine a number of component spectra which can be used to reconstruct the original spectra. There are a number of methods of determining the component spectra, including using neural networks and Fourier analysis. A particularly suitable method is that of principal component analysis. The combinations of these spectra are typically weighted and a selection of only the most influential components is generally used in the weighted combinations. Typically three component spectra are selected and used to form all of the spectral combinations.

A "white point" is typically defined for use as a white reference. This increases the accuracy of the method in that it acts as a reference point to ensure that the colours in the perceptual colour space actually resemble reality. The white reference may be defined mathematically as a certain perceptual colour space value (X,Y,Z or L,A,B), whereas alternatively it may be defined using a device value (RGB), a "white" part of the target image, or such that it corresponds to the saturation level of the scanner detector.

One or more of the target spectra, component spectra or device spectral response are typically represented as discrete data, with each of these preferably being represented in this way. The data are preferably then entered into one or more matrices in order to perform matrix calculations.

The use of data triplets (X,Y,Z L,A,B R,G,B) to represent particular colours makes it convenient to use three component spectra with the first and second aspects of the invention. However, enhanced accuracy may be obtained when, for each colour represented in the device or perceptual colour space data sets, the method further comprises generating a set of candidate spectra using one or more additional variable parameters related to the corresponding colour data in the data set, and selecting or generating a resultant spectrum from the set of candidate spectra.

A set of candidate spectra are thereby generated using variable parameters which can be thought of as representing a modification of one or more of the colour filters in a colour scanner, such as by placing a further filter over one of the RGB scanner filters. Therefore when each colour in the data set is described using three colour values, the variable parameter typically comprises a fourth (or possibly fifth and sixth) value, related to one of the three colour values.

The device spectral response may be obtained by a method involving the measurement of the response, for example, in the case of a scanner, by converting the scanner into a rudimentary spectrophotometer. This can be also be achieved by injecting light of known wavelength and power into the scanner or detector and measuring the source illumination.

However, preferably the device spectral response is determined according to a method comprising:

obtaining a filtered light response from a number of filters of a filter set, wherein each filter has a pass band with at least one boundary defined by a transition region, wherein in the wavelength region of interest, adjacent transition regions of the same sense are substantially non-overlapping;

storing the obtained filtered light response for each filter as response data; and determining the device spectral response using the stored response data and separately determined data describing the spectral response of the number of filters.

These filtered light responses are generally determined by measuring the total amount of light received over at least part of the spectrum for each filter. The separately determined data describing the spectral responses may also be obtained using a spectrophotometer.

There are a number of components which may influence the device spectral response such as device optics, the light detectors and electronics used. These may make separate contributions to the response. Typically in the case where the device is a scanner having its own light source, the spectral contribution from the scanner light source is included in the device spectral response.

Ordinarily the obtained response contains colour information and typically separate device spectral responses are determined for one or more of a red, green or blue channel respectively. These responses may be produced using corresponding red, green or blue filters such that the device spectral responses include the spectral contributions from the said red, green or blue filters.

In order to speed the process and to reduce errors caused by variations in illumination, preferably each of the number of filters of the filter set is scanned during a single scan.

The step of determining the scanner spectral response preferably comprises describing the spectral response of a number of filters of the filter set as a matrix, such that for each filter, the spectral response is described as a series of values across the spectrum, wherein the matrix is performed from the said discrete value for each filter of the number of filters. This conveniently provides the data describing the scanner spectral response in a format consistent with the discrete data used for principal component analysis.

In this case, the device spectral response is normally determined by multiplying scanned values representing the scanned response by the inverse matrix of the scan of the spectral response of the said filters. This step may be performed using singular value decomposition.

The inverse matrix in such cases is typically generated using a selected number of Eigen vectors, and preferably the selection of these Eigen vectors is based upon their contribution to the scanner spectral response for example using the order or magnitude of the Eigen vectors.

Typically this is an iterative process which is performed by a computer system.

Some examples of the method according to the present invention will now be described with reference to the accompanying drawings, in which:

BRIEF DESCRIPTION OF THE DRAWINGS

FIG. 9 is a flow diagram of the method of determining a device spectral response;

DETAILED DESCRIPTION OF EMBODIMENTS

Examples of methods according to the present invention are now described with reference to FIGS. 13 to 19. These are followed by a description of a suitable method of determining a device spectral response for use in conjunction with the invention, as detailed in FIGS. 1 to 12.

Figure 13:
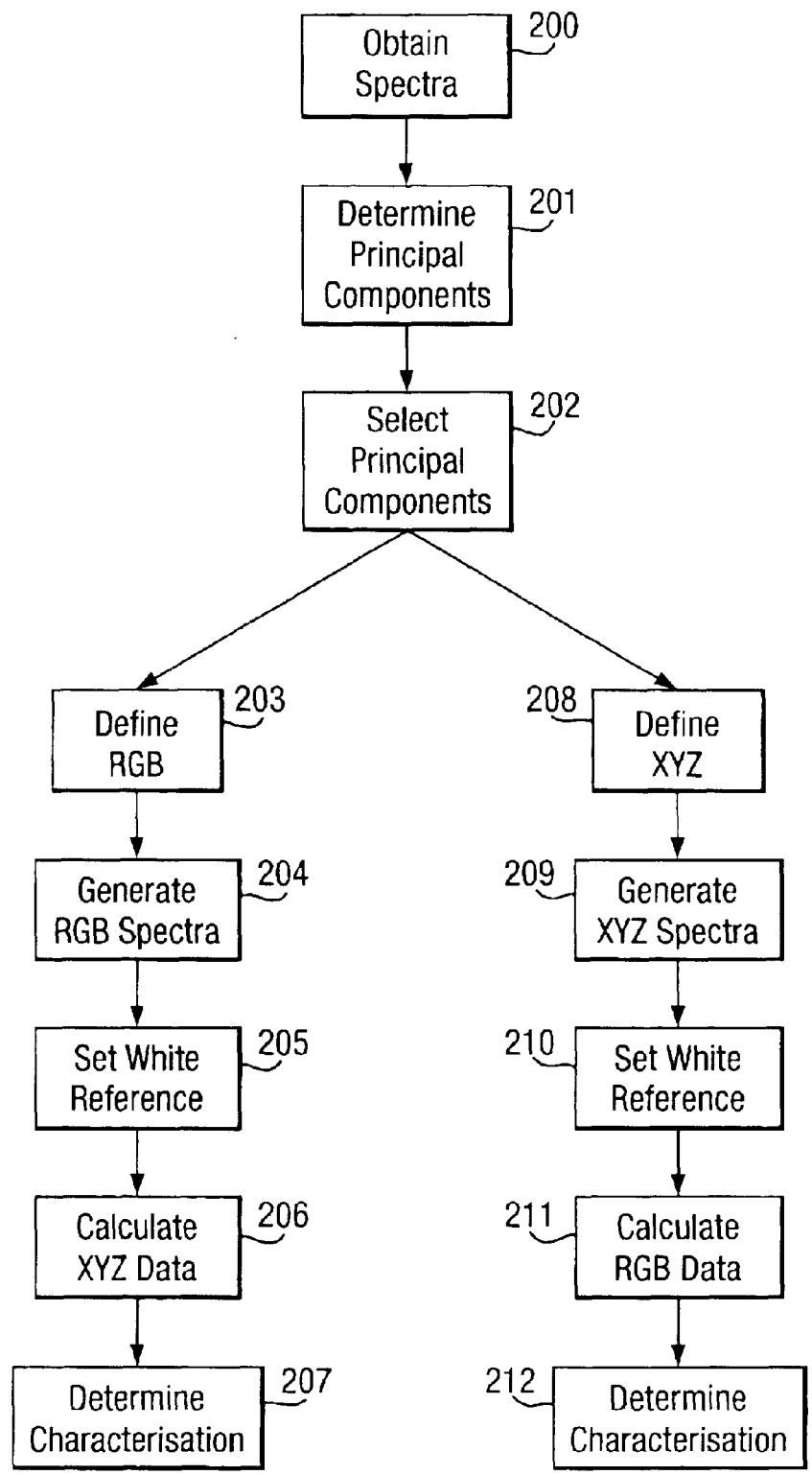
FIG. 13 is a flow diagram of a method according to the invention.

FIG. 13 is a flow diagram of the method according to a first example. The method begins at step 200 where an old painting is spectrally analysed at a number of positions using a spectrophotometer. Typically around 50 spectra are measured, one from each position, either at random or within a grid pattern upon the painting (the target medium). Each of the spectra are sampled at 31 points in the 400 to 700 nm optical range. This gives a 10 nm sampling resolution, the choice of this resolution being in accordance with the method used in determining the device spectral response to be described later. The device in this case is a scanner.

Figure 14:
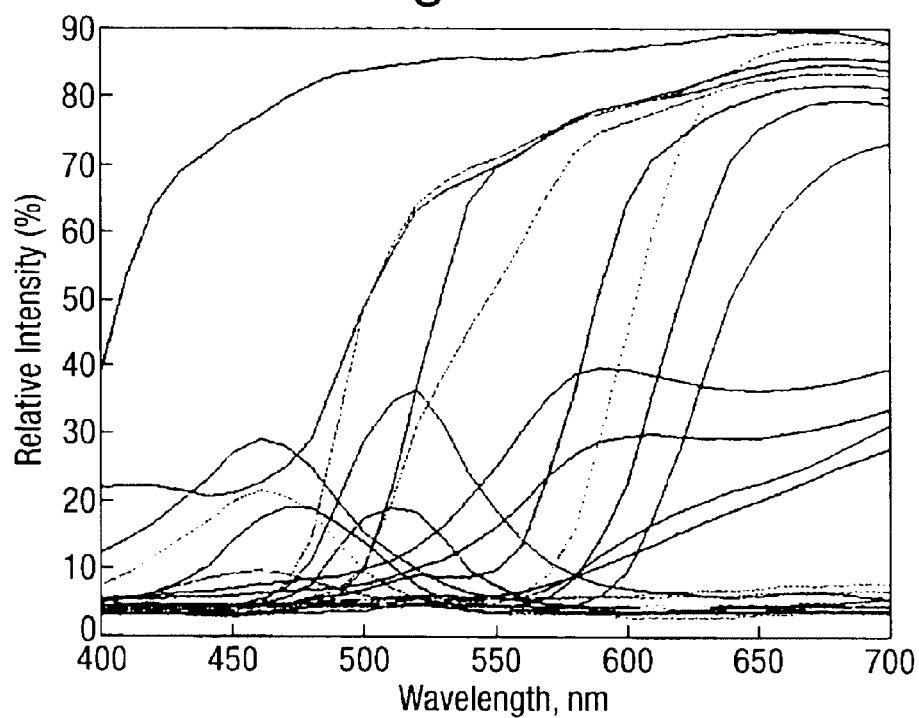
FIG. 14 is an example of a set of spectra from a target image.

An example of the spectra produced is shown in FIG. 14. It is desired to analyse these spectra in order to determine a number of principal component spectra from which each of the spectra may be reproduced, in this case using linear combinations of the component spectra.

Once data describing the spectra in each case have been obtained, these are then processed at step 201 in order to determine a set of principal component spectra. The principal component spectra are a set of spectra from which combinations of the measured spectra shown in FIG. 14 may be reproduced.

Using the 31 sampling points for each spectrum, a software package such as MatLab is used to determine the principal components. Due to the sampling used, this results in 31 principal components being determined with a corresponding 31 associated weights.

The components are ranked by their contribution to the target spectra (from which they are determined) and at step 202, the three most significant principal components are chosen for further use. This of course involves discarding some of the fine structure data for each of the spectra associated with the remaining principal components.

It has been found that most paint sets can be modelled by three principal components so as to reproduce 98.5% of the spectral information, whereas five principle components give 99.6% of the spectral information.

However, in the case of artists' paint sets it has been found that these are quite smooth (lacking fine structure) and they can be more reliably reconstructed from a linear combination of a small number of principal components. This is advantageous in the present example as only three values are used to describe the device dependent and independent colours, that is the colour of the scanned medium as seen by the scanner (device colour space) and as seen by the human eye respectively (perceptual colour space).

It is therefore mathematically convenient to use only three principal component spectra in this example.

Figure 15:
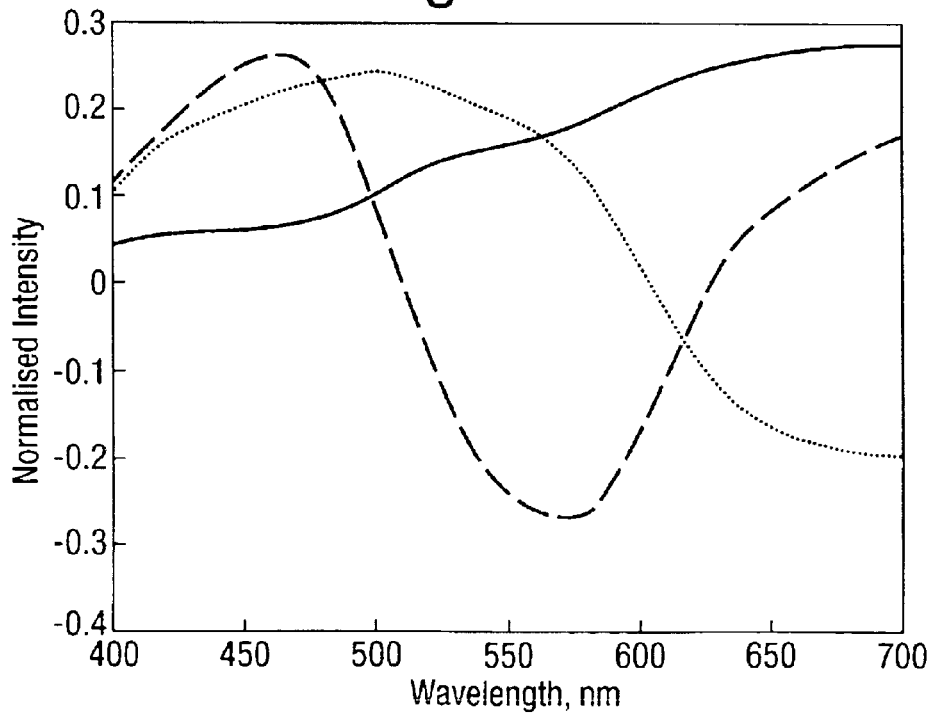
FIG. 15 shows three determined component spectra.

FIG. 15 shows an example of the three principal components determined. Each of these takes the form of a component spectrum being described by 31 data points.

Figure 16:
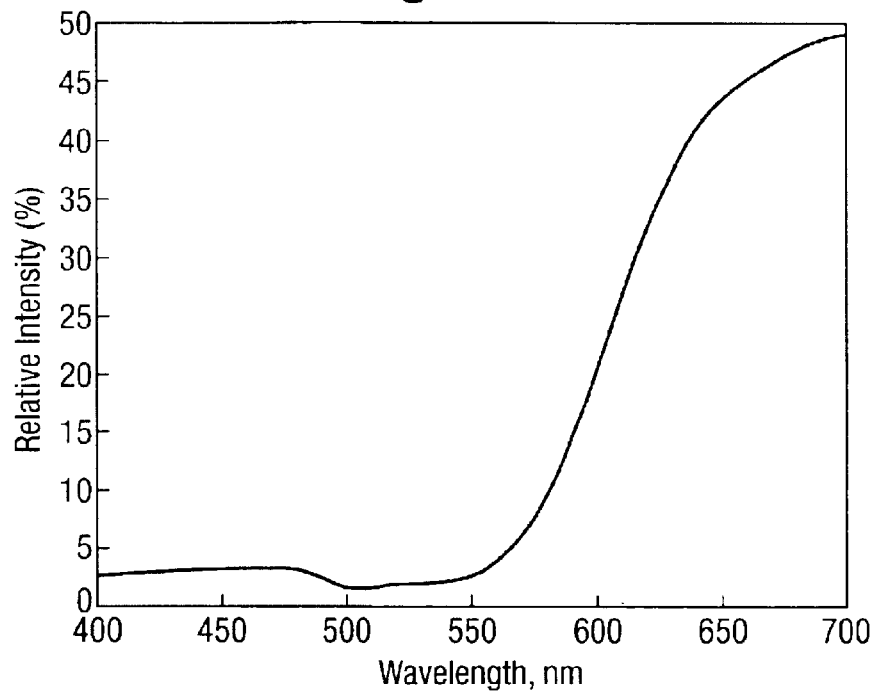
FIG. 16 shows a spectrum reconstructed using the components.
Figure 17:
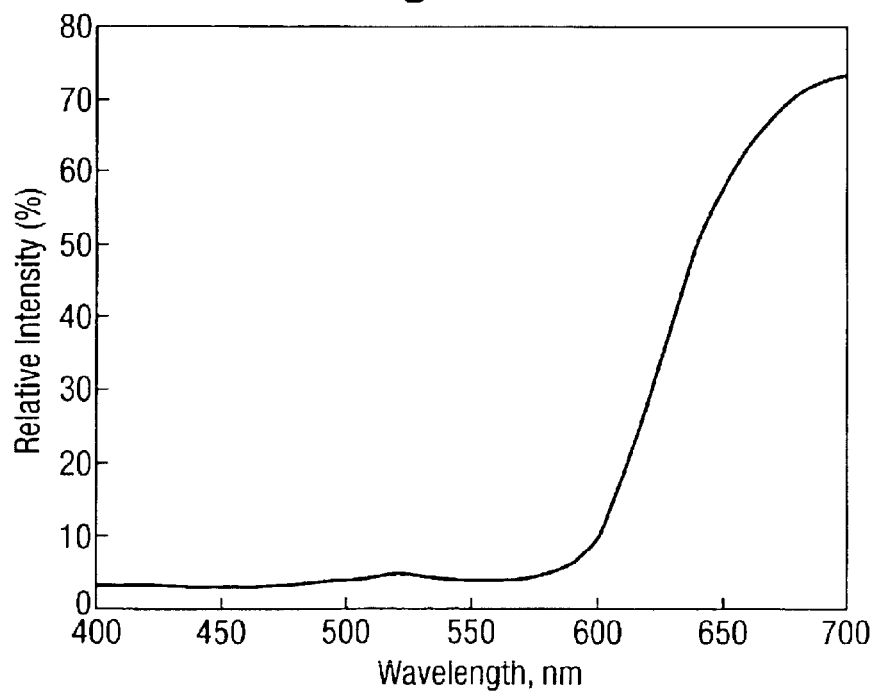
FIG. 17 shows the corresponding spectrum as measured.

FIG. 16 is an example of the reproduction of a particular measured spectrum using the three principal component spectra. FIG. 17 shows the actual spectrum for comparison. As can be seen, the two spectra are similar in form, although not identical.

The object of determining the principal components is to be able to spectrally analyse an image or "paint set" and to produce a "pseudo set" of colours which represent colours that can be reproduced from that paint set. This enables potentially any paint set to be characterised and extended to cover the possible colour gamut. If sufficient colour samples are used, an acceptable characterisation can be generated without the need to produce expensive characterisation charts for every paint set.

This is equally applicable to paint sets in which it is not possible to produce a chart such as for old paintings, or where the paint set is completely unknown.

The principal components can be thought of as Eigen vectors of a data set. MatLab provides a method of extracting a set of Eigen vectors (the principal components) using a singular value decomposition technique. This produces not only a set of vectors but their relative values or weights.

As is described in more detail later, a colour scanner generally produces a red (R), green (G) and blue (B) value to describe the colour of a point upon a scanned medium. These three colour responses are determined individually in a scanner such that the R,G and B values are given as follows:

R=Media Response*Red Device Spectral Response
G=Media Response*Green Device Spectral Response
B=Media Response*Blue Device Spectral Response Here, the "Media Response" can be thought of as the spectrum of the particular point in question from the painting, the R,G and B values are those determined by the scanner and the corresponding device spectral responses represent the combined effect of the scanner light source, optics, the respective R,G,B filter and the scanner detector.

The RGB values therefore represent the convolution of the responses.

It is therefore possible to replace the media response with the three principal components and corresponding weights for a particular spectrum. The R,G and B values can therefore be written as:

R=Principal Components*Weights*Red Device Spectral Response

G=Principal Components*Weights*Green Device Spectral Response

B=Principal Components*Weights*Blue Device Spectral Response

Therefore, given the principal components, the weights and the respective device (scanner) spectral responses, it is possible to predict the R,G and B values for a particular obtained spectrum. Equally, the R,G and B values can be defined and, as the principal components and the device-spectral responses are the same in each case, the corresponding weights can then be determined so as to reproduce a spectrum that would produce the corresponding R,G and B values, as follows:

Spectrum=Weights*Principal Components

Therefore for any set of R,G,B values, it is possible to define a spectrum which when convolved with the device spectral response would produce these values. In a similar manner to the way in which the spectra may be related to the R,G,B values, they may also of course be related to the device independent X,Y,Z or L,A,B values for example simply using the CIE colour matching function responses, as are known in the art.

Returning to FIG. 13, in this example it is the R,G,B values that are set and the corresponding spectra are determined from these using the principal components. As a result, at step 203 a "device data set" of R,G,B values is defined. The values chosen are intended to cover the entire colour gamut. This can be thought of as a three-dimensional matrix of points, equally distributed along three orthogonal axes to form a cube of points. The three axes correspond to red (R), green (G) and blue (B).

Having defined these values, the principal components are used to determine a corresponding spectrum for each of the points within the R,G,B cube. A set of constructed spectra are therefore produced at step 204. This of course requires the red, green and blue device spectral responses to be taken into account and a suitable method for achieving this will be described fully later.

Once the spectra have been constructed for each of the R,G,B values at step 204, the spectra can then be used in accordance with the CIE colour matching function responses in order to reproduce corresponding X,Y,Z (or L,A,B) values representing colours in a perceptual colour space as they would appear to a human observer. However, in order to achieve this a "white reference" is first defined to relate the appearance of white as seen by the scanner device to that as seen by an observer. The white reference is taken into account at step 205.

In the present example a white reference point is set in terms of maximum R,G and B values. The corresponding spectrum is constructed in accordance with the device spectral responses and this is then used to produce a corresponding X,Y,Z or L,A,B value. This can be thought of as one of the points within the colour gamut cube.

A data set of X,Y,Z or L,A,B values corresponding to the data set of R,G,B values (via the constructed spectra) are generated at step 206.

Having defined a set of R,G,B values and having obtained a corresponding set of X,Y,Z values, it is then possible to use these values in a standard manner, as for a real colour chart, to determine a characterisation. This involves establishing a relationship between the R,G,B values and the X,Y,Z/L,A,B values. This characterisation is determined at step 207.

As mentioned above, once the principal components have been determined, either a set of R,G,B values or a set of X,Y,Z (or L,A,B) values can be defined. An alternative example is now described, again with reference to FIG. 13, in which X,Y,Z values are defined.

FIG. 13 shows an alternative set of steps (208 to 212) for determining the characterisation. In this case, following the determination of the three principal components at step 202, a set of X,Y,Z values is defined at step 208 rather than a set of R,G,B values. Again, the values chosen can be thought of as a data set comprising points within a cube, the cube this time having X,Y and Z axes, and representing a perceptual colour space.

At step 209 the CIE D50 response is used to calculate the corresponding spectra for each of the X,Y,Z values. A white reference is then set at step 210. At step 211, each of the spectra are convoluted with the scanner device responses in order to generate the corresponding R,G,B values. Finally at step 212, the X,Y,Z and corresponding R,G,B values are then used to determine a corresponding characterisation for the device.

Upon analysing spectra generated within the gamuts of defined R,G,B or X,Y,Z values, a number of these spectra were found to have negative values corresponding to negative intensities. This is of course not physically realisable and therefore this indicates that the particular spectra generated from the principal components cannot actually be generated in reality.

Figure 18:
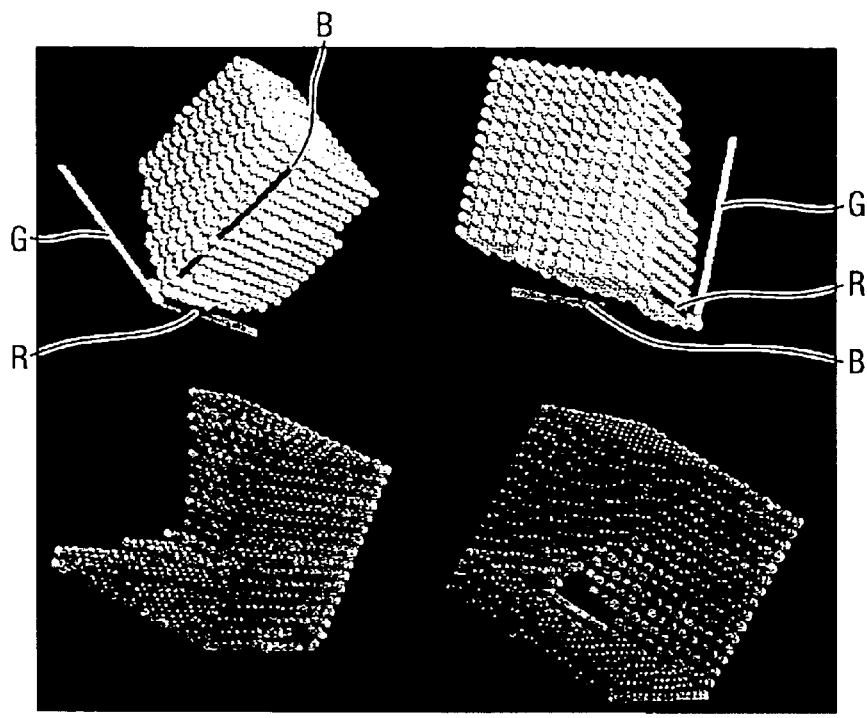
FIG. 18 illustrates a physically realisable colour gamut for a medium.

FIG. 18 shows a 3-dimensional representation of this for a particular set of R,G,B values. Each R,G,B value is represented as a point within an orthogonal coordinate axis system in which the axes are the R,G and B values respectively. Two orientations of these axes are shown in the upper part of FIG. 18. The points in the two upper parts of the figure indicate values of R,G and B which result in positive spectra whereas those below in each case correspond to values which produce negative spectra.

As the pattern has a strong resemblance to the gamut shape of a material, it is thought that the negative value are an indication of predicted spectra being out of the gamut, that is, not physically realisable on the medium. Therefore any such colours represented by points within the lower part of FIG. 18 should not be physically realisable.

In either of the above versions of the method as shown in FIG. 13, in arriving at step 207 or step 212, it is necessary to know a device spectral response for the scanner. A suitable method of determining such a device spectral response for an image recording device is now described.

The method of determining a device spectral response for an image recording device, comprises the steps of:

obtaining a filtered light response from a number of filters of a filter set, wherein each filter has a pass band with at least one boundary defined by a transition region, wherein in the wavelength region of interest, adjacent transition regions of the same sense are substantially non-overlapping;

storing the obtained filtered light response for each filter as response data; and determining the device spectral response using the stored response data and separately determined data describing the spectral response of the number of filters.

According to this method, the identification of the device spectral response is provided by the use of the filter set which allows the response at different wavelengths to be analysed. In addition, the actual spectral responses of the filters are separately determined and this information is used in conjunction with the response (for example, obtained values) stored according to each filter, in order to determine the spectral response of the device. Examples of such image recording devices include scanners and digital cameras and this method is equally applicable in each case.

The use of such a response is particularly advantageous for scanners in that it reduces the time required to generate scanners characterisations (profiles) for various media by removing the need to scan the individual media on the target device.

The determined "device spectral response" in fact typically comprises a number of individual and independent responses. We have realised that the commutative nature of the contributions from the various apparatus within the scanner or camera allows these contributions to be treated as a unitary response.

The response of the detector is generally included in this unitary response along with responses from the device optics such as any lenses, mirrors and other filters thus obtaining an "overall" device spectral response encompassing the entire characteristic of the device. In particular for scanners, the device spectral response preferably includes a spectral response of the scanner light source.

In the case of colour devices, separate device spectral responses are typically determined for one or more of a red, green or blue scanner channel respectively.

Typically three colour channels as used such as red, green and blue channels respectively (although other numbers of channels could be used).

A separate device spectral response is preferably determined for each channel used. Red, green and blue device spectral responses can be determined using the corresponding red, green and blue filters and the device spectral responses for each may include the spectral responses of these filters as part of the unitary response.

The separate responses corresponding to these three colours could be obtained using three separate images or scans, although typically they are obtained in a single step by dividing the incident light from the filters and passing it through the individual colour filters, for example using a beam splitter.

In addition rather than performing a separate scan or obtaining a separate image for each of the number of filters in the filter set, these filters may be arranged such that the response is obtained for each filter in a single step. For example this may be achieved in a scanner by arranging the filters in an array upon the scanner platen.

The separately determined data describing the spectral response of the number of filters of the filter set may be represented discretely as a matrix, such that for each filter, the spectral response is described as a series of values across the spectrum and wherein the matrix is formed from the said discrete values for each filter of the number of filters.

The inverse of this matrix in conjunction with the scanned values for the filter set can then be used in determining the device spectral response. Typically this is achieved by multiplying the obtained responses (values) for the filters by the inverse matrix of the spectral response of the said filters.

The device spectral responses for each colour are generally represented as vectors having an identical number of components to the number of components used in the representation of the filter spectra.

A number of mathematical techniques are available for use in inverting the spectral response matrix and in particular singular value decomposition methods have been found to generate favourable results. These methods may be conveniently performed upon a computer system such as a desktop PC or a dedicated onboard computer within a scanner/camera.

Although one location for each filter from the filter set may be used to perform the method, a more accurate result may be achieved by using a number of locations for each filter and for example combining the result by averaging.

The separately obtained spectral measurements can be made by placing the filters within apparatus such as a spectrophotometer. Again greater accuracy can also be achieved here by using a number of measurements at different locations across the filters.

As the scanner (device) spectral response is independent of the medium scanned, profiles can be generated for known colour charts having various coloured patches (previously used in the characterisation of scanners) without performing actual scans. The only data needed to generate such profiles is accurate spectral data from each area of the colour chart and the device spectral response. Using the combination of the device response and the spectra of the media, scanner values in RGB may be synthesised and patch LAB values may be determined directly from the patch spectra.

The accuracy with which the device spectral response may be determined is in part dependent upon the filter set used. In a preferred filter set for use with the method, each filter has a pass band with at least one boundary defined by a transition region, wherein in the wavelength region of interest, adjacent transition regions of the same sense are substantially non-overlapping. The transition regions of the filters are arranged to be substantially non-overlapping (in wavelength) as overlaps significantly reduce the accuracy of the results achieved.

A number of different filter types can be used. For filter sets having filters in which a single transition region is present in the wavelength region of interest, the transition regions of the filters are preferably arranged adjacent one another within this region.

In this case, preferably each transition region is bounded by upper and lower wavelengths and the filter set is arranged such that the upper wavelength of one transition region and the lower wavelength of an adjacent transition region are at substantially the same wavelength.

Examples of such filters include high pass wavelength filters in which wavelengths of light longer than those within the transition region are substantially passed by the filter whereas wavelengths of light shorter than those within the transition region are substantially blocked. Alternatively, low wavelength pass filters can be used such that wavelengths of light smaller than those within the transition region are substantially passed by the filter whereas the wavelengths of light longer than those within the transition region are substantially blocked.

A further alternative is to use filters having more than one transition region, such as band pass filters. In this case each filter has a pass band within upper and lower wavelength boundaries, each boundary being defined by corresponding upper and lower transition regions of opposite senses, each transition region being within the wavelength region of interest. Each filter of this kind typically has an upper and lower transition such that only light of a wavelength between the upper and lower transitions is substantially passed by the filter whereas light of other wavelengths is blocked.

Preferably the filters are arranged such that their corresponding pass bands are substantially adjacent in the wavelength region of interest. For adjacent filters, the transition region of one filter is therefore preferably adjacent to the transition region of the opposite sense for an adjacent filter.

In general when filters of similar type are used within a filter set, the transition regions of the same sense for each of these filters are preferably substantially equally spaced in wavelength with respect to one another. In this way the part of the optical spectrum of interest can be spanned evenly.

For all transitions, it is desirable that the transition as a function of wavelength between the effect of allowing light to pass and to be blocked is as rapid as possible. This allows an increased number of filters to be used in that the transition between the filtering (block) and non-filtering (pass) effect is limited to a very narrow wave band.

Depending upon the arrangement of the particular scanner, the filters may be arranged as either transmissive or reflective filters.

An example of the method of determining a device spectral response is now described for a scanner, with reference to FIGS. 1 to 12 of the accompanying drawings.

Figure 1:
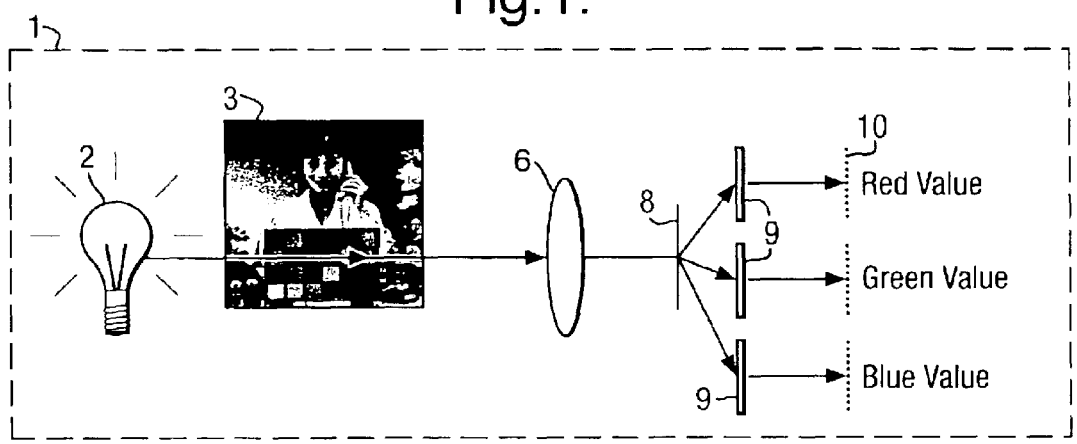
FIG. 1 is a schematic representation of a scanner.

FIG. 1 is a schematic illustration of the main components of a known scanner apparatus, generally indicated at 1. A light source 2 is provided which illuminates a medium 3, the medium 3 in this case being a photograph.

As is known, scanners can have either transmissive or reflective configurations, such that the light from the light source is either passed through or reflected from the medium 3 respectively.

In FIG. 1, a transmissive scanner is shown in which light transmitted through the medium 3 is analysed. The transmitted light passes through a lens or lenses 6 and impinges upon a beam splitter 8. The beam splitter 8 divides the incoming light beam into three beams which are then directed through three transmissive colour filters 9.

The three colour filters 9 are provided in the form of red, green and blue filters. These filters are arranged to only allow the passage of light having wavelengths within the corresponding spectral ranges of red, green and blue light. Each of the three filtered light beams then impinges upon detectors 10 where the intensity of the component beams is converted into corresponding data and these data are eventually output by the scanner as red, green and blue values respectively.

The spectra of the light beams from each of the filters 9, when measured at the detectors 10, contains spectral contributions from a number of the components within the scanner, and in particular the light source 2, the medium 3 (this being the spectrum of interest) and one of the colour filters 9.

Figure 2:
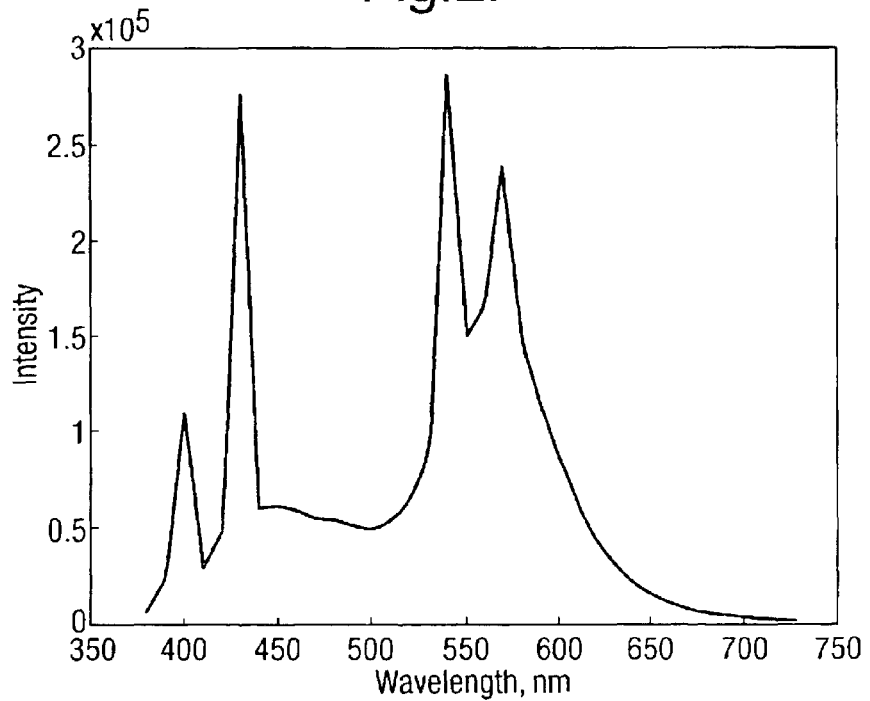
FIG. 2 shows a typical spectrum for a light source.

Referring now to FIG. 2, a typical spectrum from the light source 2 is shown. It can be seen immediately that this contains characteristic peaks and that therefore the intensity of the emitted light at some wavelengths is much greater than that at others.

Figure 3:
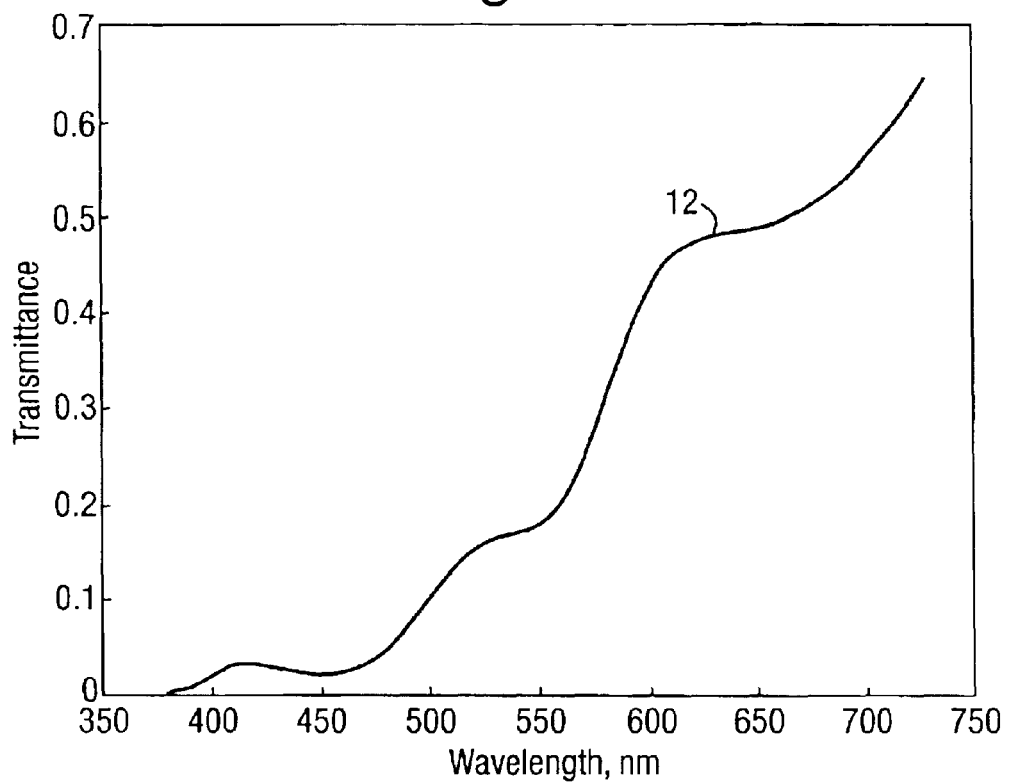
FIG. 3 shows a typical spectrum from a medium.

In FIG. 3, a spectrum 12 is indicated which represents the spectrum of a particular point upon the medium 3 assuming it were illuminated with incident light having a constant intensity at all wavelengths (pure white light).

The spectral response of typical red, green and blue filters 9 is indicated at 13, 14, 15 respectively in FIG. 4, again using pure incident white light. In addition, a further filter is often provided which blocks most of the incident infra-red wavelengths, that is those greater than 700 nanometers. This prevents unwanted heating of the apparatus and infra-red light outside the visible spectra affecting the red response.

Figure 4:
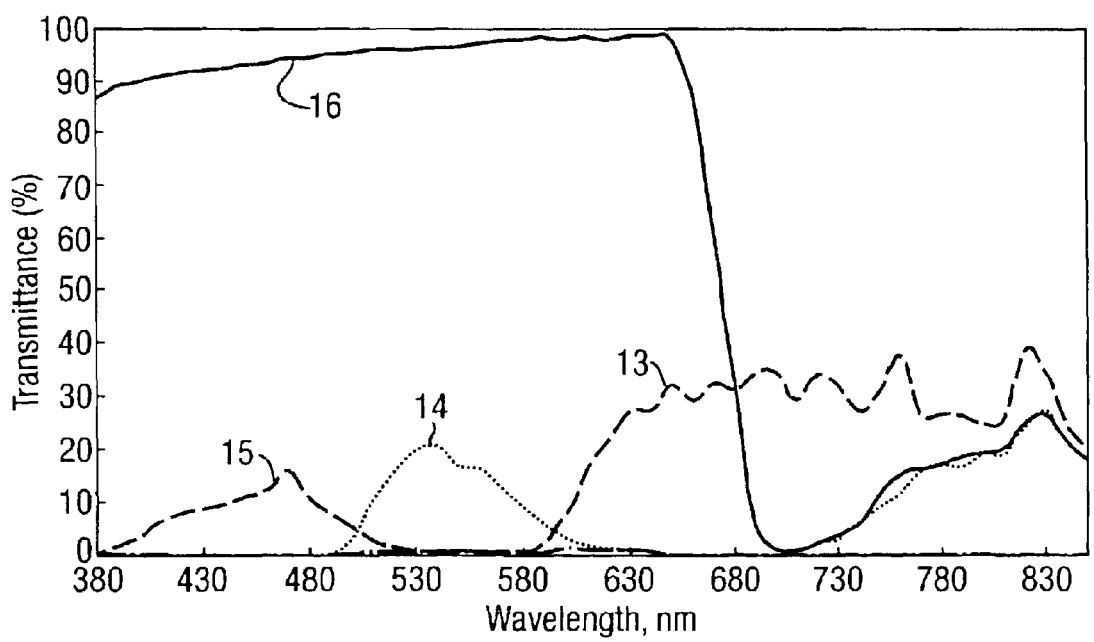
FIG. 4 illustrates typical R,G,B and infra-red filter spectral responses.

The spectral response of this filter is shown at 16 in FIG. 4. In some cases an additional ultra-violet filter is also provided (not shown).

As a result of the combination of the spectral responses of the light source 2, medium 3, and the filters 9, including any additional infra-red or ultra-violet blocking filters, three overall spectra corresponding to the three colour filters 9 are presented to the detector(s) 10 of the scanner 1.

Figure 5A:
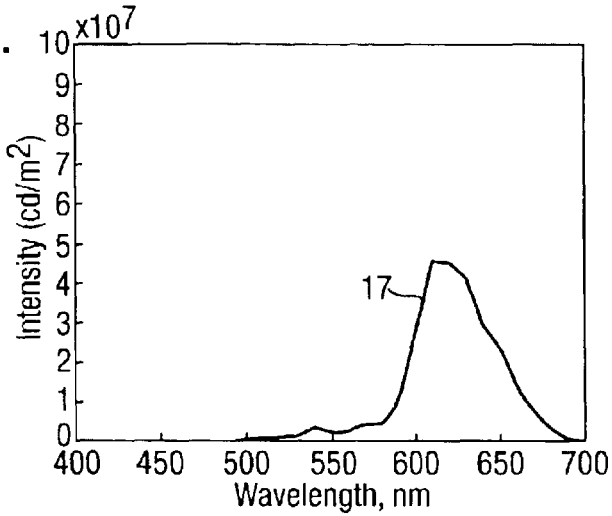
FIG. 5a shows the combined spectrum obtained through the red filter.
Figure 5B:
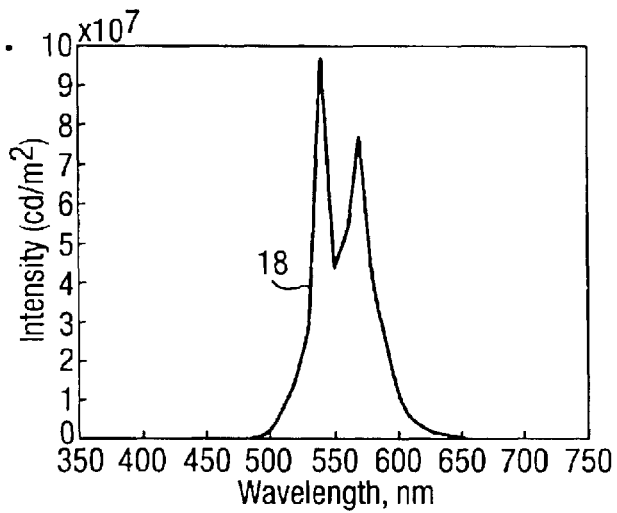
FIG. 5b shows the combined spectrum obtained through the green filter.
Figure 5C:
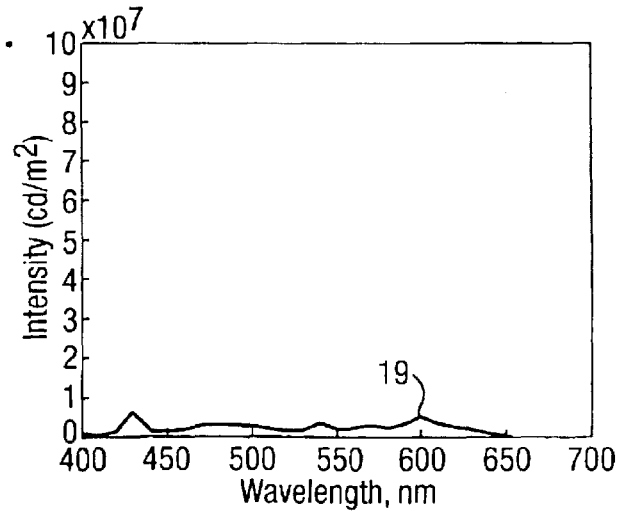
FIG. 5c shows the combined spectrum obtained through the blue filter.

Examples of these three spectra are shown in FIGS. 5a, 5b or 5c for the red, green and blue filters respectively. It can be seen in FIG. 5c that very little light is incident upon the detector 10 for the blue filter 9 as would be expected when the spectrum of FIG. 3 is considered as this has little intensity at shorter wavelengths.

The detector 10 operates by effectively integrating the total light intensity received for all light wavelengths across the visible spectrum, in this case being from 400 to 700 nm. A separate integration is performed using each of the three spectra according to the red, green and blue filters 9. Examples of the resultant spectra 17, 18, 19 for the three filters are shown in FIGS. 5a, 5b and 5c for the red, green and blue filters respectively.

The integration over the spectrum is therefore the area under the respective spectral curves and each of these is given a single value corresponding to the respective filter, so as to provide the "RGB" values in accordance with the art.

It should be remembered that each of the combined spectra shown in FIGS. 5a, 5b and 5c includes not only the responses from the light source and filters, but also that of the medium 3. Preferably it should not include the electronic response of the detector if possible.

Figure 6:
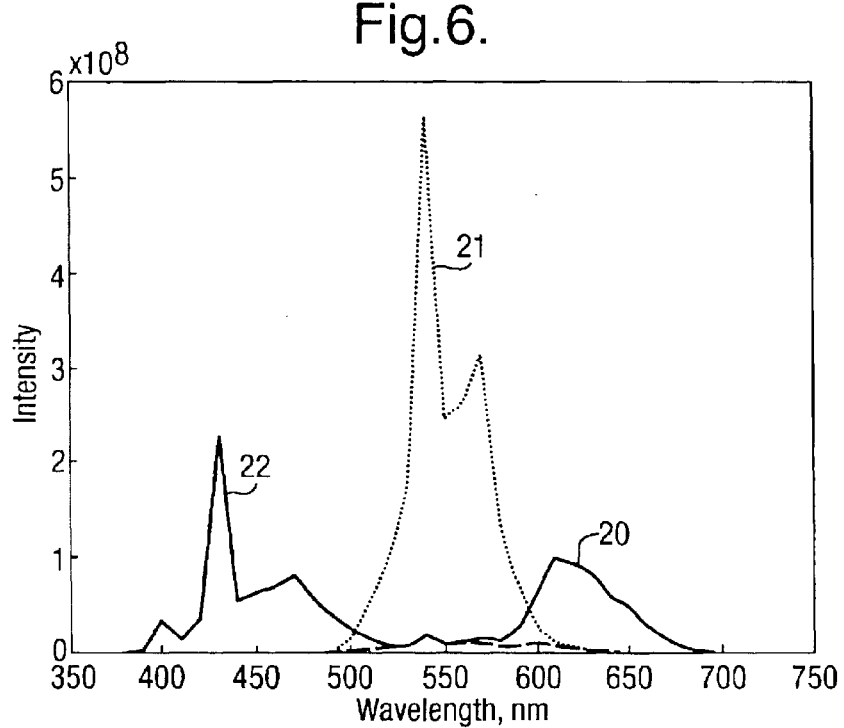
FIG. 6 illustrates the combined responses from the scanner.

The scanner spectral response is illustrated in FIG. 6 where the individual contributions according to the light source 2, lenses 6, red, green and blue filters 9 and detectors 10 are shown as spectra 20, 21 and 22 respectively. The spectra when multiplied by the spectrum 12 from the medium 3, produce the three corresponding overall responses shown in FIGS. 5a, 5b and 5c.

Figure 7:
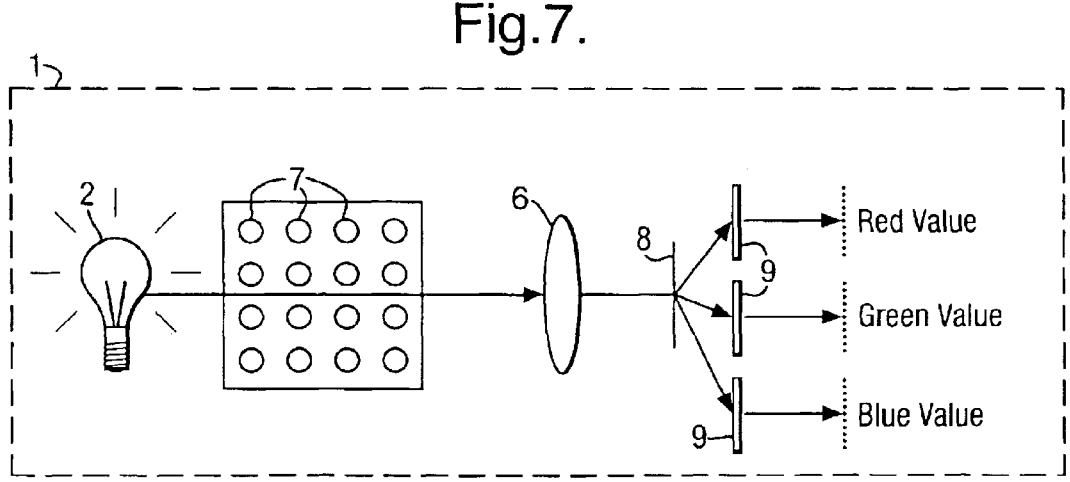
FIG. 7 shows a schematic representation of a scanner arranged to scan an array of filters in a filter set.

With respect to the known scanner described above, the example of the present invention replaces the medium 3 with a number of filters as shown in FIG. 7. Each filter 7 belongs to a filter set and these are arranged in an array such that light from the light source 2 is passed through each of the filters 7 individually during a single scan. The scanned values obtained are then processed along with the filter spectra to determine scanner response.

Figure 8:
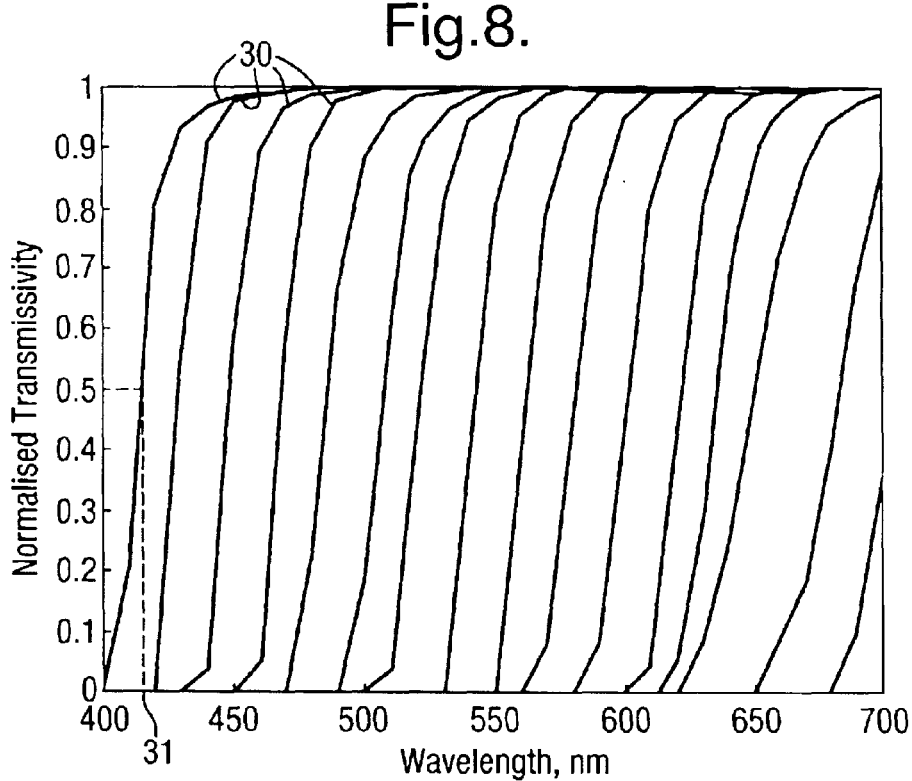
FIG. 8 shows the spectral responses of a filter set.

The spectral responses 30 of a suitable filter set having a number of filters 7, are shown in FIG. 8. In this case, each filter is a high pass (blocking) filter.

As can be seen, each filter exhibits a rapid transition between a very low transmissivity (blocking light) and a high transmissivity (passing light). This transition occurs over a few nanometers in wavelength. A threshold 31 in wavelength can be defined for each filter which in this case represents a transmissivity of substantially one half of the maximum value obtained by the filter.

As shown in FIG. 8, the filters 7 within the filter set are chosen such that their threshold values are spaced across the range of interest of the optical spectrum, this being between 400 and 700 nanometers in this case.

Using this filter set, a suitable method of de-convoluting the scanner spectral response is shown in FIG. 9.

At step 100, the filter set array is loaded into the scanner.

A scan is then performed of the array of N filters at step 101. In doing so, light from the light source 2 passes through the filters 7, impinges upon the beam splitter 8 and passes through the colour filters 9 to the detectors 10. Corresponding individual R,G and B values representing the integration of the component spectra shown in FIGS. 5a, 5b, 5c, are then recorded for each of the N filters 7 of the array.

The finite dimensions of each filter 7 are used to advantage in that R,G,B values are determined for a number of locations within each filter. These are "seen" by the detector as pixels and therefore the R,G,B values for a particular filter 7 are averaged (using the data from a number of these pixels) in order to produce a more representative value in each case. The scanned values are then stored at step 102.

For a particular point (seen as a pixel) on the filter 7, the R,G,B values can be represented mathematically as:

$$R = \int_{400\ nm}^{700\ nm} \Phi(\lambda) R_S(\lambda) \quad G = \int_{400\ nm}^{700\ nm} \Phi(\lambda) G_S(\lambda) \quad [1]$$

$$B = \int_{400\ nm}^{700\ nm} \Phi(\lambda) B_S(\lambda)$$

Where:
$\Phi$ is the spectral transmittance (or reflectance) of the point of the filter 7 in question as a function of the light wavelength $\lambda$, and $R_S, G_S, B_S$ are the red, green and blue scanner spectral responses respectively, again as a function of wavelength, using the corresponding red, green and blue filters 9. As indicated by the integral limits in Equation 1, each of the R,G,B values is determined by integrating over the "visible" wavelength, which for this example is between 400 and 700 nm.

For calculations using real data, the above integrals are converted into discrete mathematics. The spectral response $\Phi$ of each filter 7 can be represented as a vector of order M, where M is the number of samples taken across the spectrum (from 400 to 700 nm here). The samples are taken at constant intervals across the spectrum and represent the intensity of the response at a particular wavelength (or over a range of wavelengths). The wavelength range may be equal to the difference in wavelength between the sampling points.

One method of obtaining the values for the matrix $\Phi$ is to measure the optical properties of the filters 7 directly using apparatus such as a spectrophotometer. In this example, for each of the N filters, M values are used spanning the spectrum, the values taking the form of average intensity values for the spectrum in wavelength ranges, such as 10 nm (400–409 nm for example). This produces 31 discrete values for the optical wavelengths of interest. These data are obtained at step 103.

As there are N filters 7, and M measurements for each filter, then this information may be represented as an "N by M" matrix $\Phi$, as set out below:

$$\Phi = \begin{pmatrix} \phi_{1,1} & \cdots & \cdots & \phi_{1,M} \\ \vdots & \cdots & \cdots & \vdots \\ \vdots & \cdots & \phi_{i,\lambda} & \vdots \\ \phi_{N,1} & \cdots & \cdots & \phi_{N,M} \end{pmatrix} \quad [2]$$

The matrix $\Phi$ therefore contains all of the data describing the spectral responses of the N-filter array. The three spectral responses of the scanner (which are media independent) (that is for the red, green and blue filters 9), can be represented as three corresponding vectors of dimension "M":

$$R_S = (R_1, R_2, \ldots, R_\lambda, \ldots, R_M) \quad [3]$$

$$G_S = (G_1, G_2, \ldots, G_\lambda, \ldots, G_M) \quad [4]$$

$$B_S = (B_1, B_2, \ldots, B_\lambda, \ldots, B_M) \quad [5]$$

These vectors represent the scanner spectral responses in terms of discrete values across the spectrum as a function of wavelength.

A set of R, G and B values, as determined by the scanner, are produced for each filter 7. Therefore the number of R, G and B values is N. The values for the R filter 9 can be represented as an N component vector, and similarly for the G and B values. Specifically, these can be represented as:

$$R_V = (R_{V,1}, R_{V,2}, \ldots, R_{V,N}) \quad [6]$$

$$G_V = (G_{V,1}, G_{V,2}, \ldots, G_{V,N}) \quad [7]$$

$$B_V = (B_{V,1}, B_{V,2}, \ldots, B_{V,N}) \quad [8]$$

where each component $R_{V,1}$ etc, actually represents an average value of a number of pixels within the scanned area for a particular filter 7.

Equation 1 can therefore be rewritten in terms of the discrete Equations 2 to 8 as:

$$R_V = \Phi R_S^T \quad [9]$$

$$G_V = \Phi G_S^T \quad [10]$$

$$B_V = \Phi B_S^T \quad [11]$$

where the "T" superscripts represent the transpose conjugate of the vectors $R_S, G_S, B_S$.

Each of the component values of $R_V, G_V, B_V$ are obtained by scanning the filters 7 with the scanner. The values of the matrix $\Phi$ components are also required in order to determine the scanner spectral responses $R_s, G_s, B_s$. Rearranging Equations 9 to 11, the scanner spectral responses are given as:

$$R_S^T = \Phi^{-1} R_V \quad [12]$$

$$G_S^T = \Phi^{-1} G_V \quad [13]$$

$$B_S^T = \Phi^{-1} B_V \quad [14]$$

where $\Phi^{-1}$ is the inverse matrix of $\Phi$. These equations are then solved at step 104.

As will be appreciated, in general it will not be possible to generate an analytical solution to $\Phi^{-1}$ since the matrix $\Phi$ may not be square and is filled using experimental data.

However, one of a number of known approximate mathematical methods may be used to solve the inverse matrix. Suitable methods include that of performing a "pseudo" inverse for example as described in "Numerical Recipes in C, The Art Of Scientific Computing", by William H. Press, Saul A. Teukolsky, William T Vetterling and Brian P Flannery, Published by Cambridge University Press, ISBN 0-521-43108-5 which estimates the inverse using a Gaussian elimination method. Another method is to use "least squares" although this encounters problems with negative values. Negative values are not practically possible in a filter, so the solution may be mathematically correct but not represent a real filter.

A particularly successful method is that of singular value decomposition (SVD). Using this technique, the matrix $\Phi$ can be divided into three matrices as:

$$\Phi = [U].[W].[V] \quad [15]$$

where W is a diagonal matrix of the same dimension as the matrix $\Phi$, with non-negative diagonal elements in decreasing order. U and V are unitary matrices. This gives:

$$\Phi^{-1} = [V].[1/W].[U]^T \quad [16]$$

If Equations 12 to 14 are rewritten in terms of Equation 16, then an solution can be found for the scanner responses $R_S^T, G_S^T, B_S^T$.

The actual method used in the present example is an extension to the SVD process called "SVD Fit" as described in "Numerical Recipes in C", referenced above.

This method is similar to that of SVD except that it has the ability to weight the solution. This weighting is useful in the present example as the spectra from the red, green and blue filters 9 can therefore be limited to appropriate parts of the spectrum. The SVD fit method directly produces a solution for $R_S^T$, $G_S^T$, $B_S^T$.

As will be appreciated, it is beneficial to place a tolerance upon the Eigen values in W. Small Eigen value contributions will dramatically affect the solution of Equation 16 (due to the "1/W" term). In addition, it is possible to reduce the resultant high frequency noise (caused by higher Eigen vectors and values) by ignoring some of these higher values. An analysis of the contribution of the Eigen vectors to the final answer is therefore recommended. A combination of removing the small values in W, selecting only a number of the vectors and assessing the contributions from these vectors, leads to a stable solution bearing in mind that an oversimplification rejecting too many Eigen vectors will cause inaccuracies in the results. Therefore a balance should be maintained between removing noise on the one hand and maintaining accuracy on the other.

It will be appreciated that, the method will be generally implemented using a computer system. In this case a desktop PC can be programmed to perform the calculations associated with the method.

A number of known data processing techniques used in scanners can influence the accuracy of the results. For example, "gamma correction" is usually applied to scanned images in the form of a transfer function, as it is known that such gamma correction produces a more pleasing image to the eye when viewed on a screen.

The response data is also conventionally "logged" in order to compress the data range and this can affect the accuracy of the results due to the accuracy with which the logged data is recorded. Additional further processing is also sometimes performed upon the data.

In general, for the present method, it is desirable to use the data in the unprocessed or raw form, that is "linear" data in "transmission space", however, logging and gamma correction can generally be inverted to obtain transmission data.

Noise in the data should also be minimised in order to improve the accuracy of the results. Typically noise, is a direct result of the accuracy to which the data are measured, the truncation of data and random noise within the system (such as due to the electronic components). It has been found that some filter sets are more suitable than others when attempting to reduce noise within the system. This is mainly due to the sharpness of the filter and the spacing of the filter set, also the quality of the filter and hence its uniformity can help to reduce noise.

In order to test the method, several different filter sets were examined for their ability to recover scanner response. Each filter set was used to create a filter array which was then scanned to recover the scanner spectral response.

Figure 10:
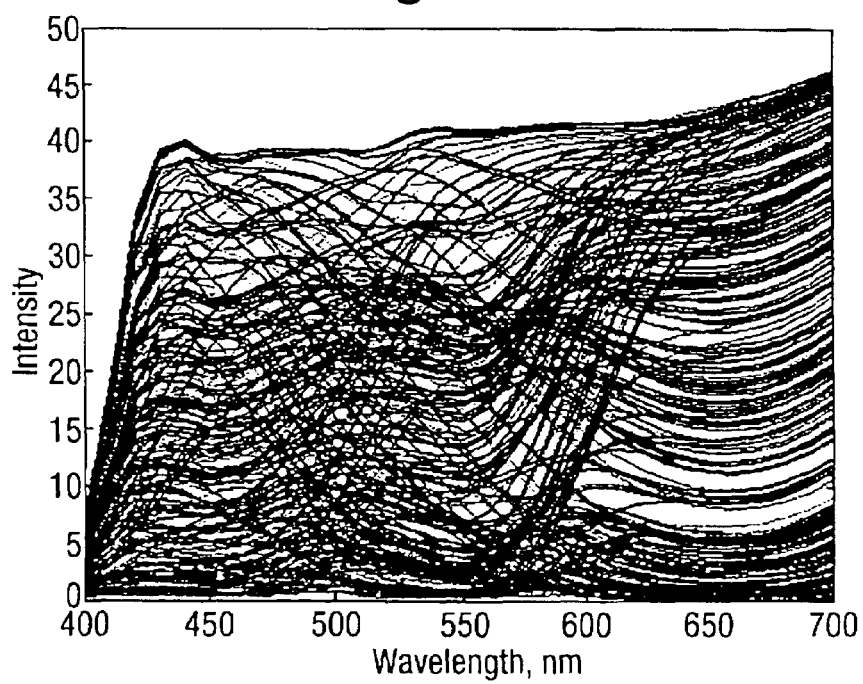
FIG. 10 represents the spectra from the IT8.7 data set.

Once the scanner spectral response was determined, this was then used to predict the response of the scanner to the IT8.7 data set using the spectra of the patches shown in FIG. 10.

Figure 11:
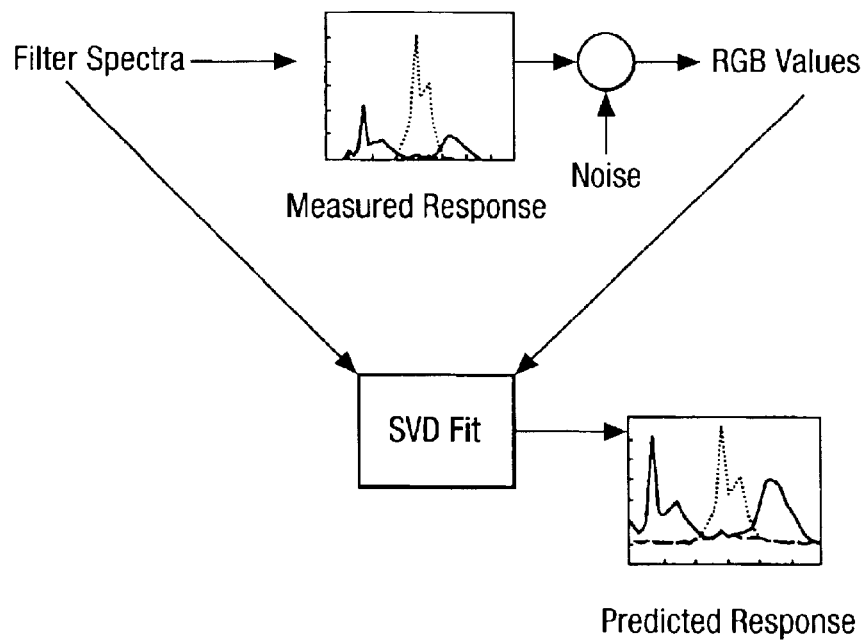
FIG. 11 shows the generation of RGB values.
Figure 12:
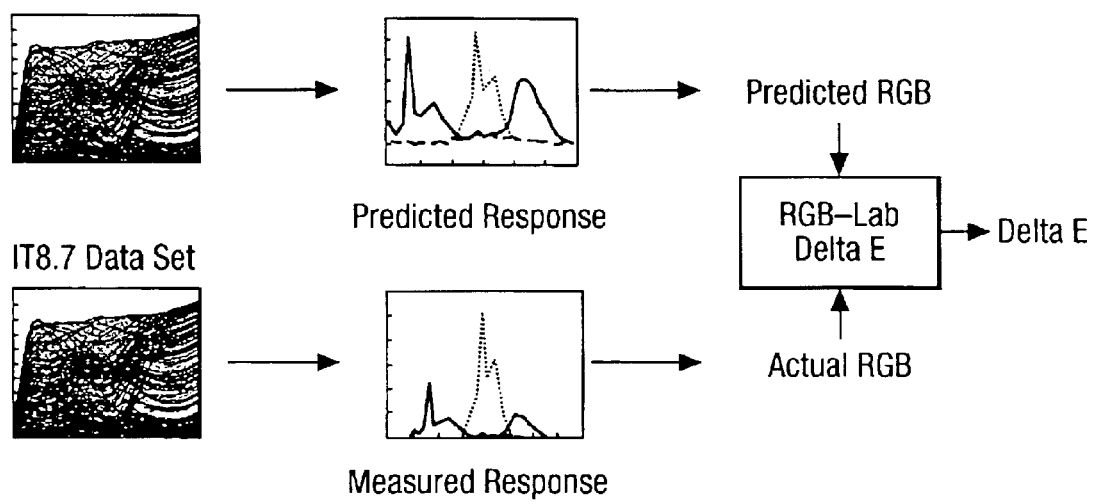
FIG. 12 shows the method of comparison between predicted and measured values.

As shown in FIG. 11, the predicted RGB values for the IT8.7 data set were obtained by convolving the spectra from each patch with the scanner spectral response determined using the different filter sets.

Using spectra rather then real charts/paint sets is not a completely realistic analogue as, aside from the scan variations mentioned above, noise is always present within the scanner systems and this influences the results. In order to take account of this, an amount of mathematical random noise was added to the data to make the results more realistic. A set of "measured" RGB values were then calculated for the "measured" scanner response spectra.

The predicted RGB values were then compared with the measured RGB values for IT8.7/3 charts and paint sets. In each case the RGB value was converted to an approximate LAB value to enable a "Delta E" number to be calculated. This gives a measure of the quality of recovery upon real data. The overall process is summarised diagrammatically in FIG. 12.

The predicted RGB values were then compared with the measured RGB values for IT8.7/3 charts and paint sets. In each case the RGB value was converted to an approximate LAB value to enable a "Delta E" number to be calculated. This gives a measure of the quality of recovery upon real data. The overall process is summarised diagrammatically in FIG. 12.

It is however important that the method is as accurate as possible because the input profile is generated based upon the predicted rather than the scanned R,G,B values.

As a result of experimentation it has been found that the filters should have very narrow transitions in wavelength and that there should be minimal overlap between transitional regions of the filters. The visible spectral range should ordinarily be covered by these filters.

Returning to the present invention, the examples described above in connection with the present invention and the method of determining a device spectral response, have been limited to the selection of three principal components in order to produce the spectra for the media.

Figure 19:
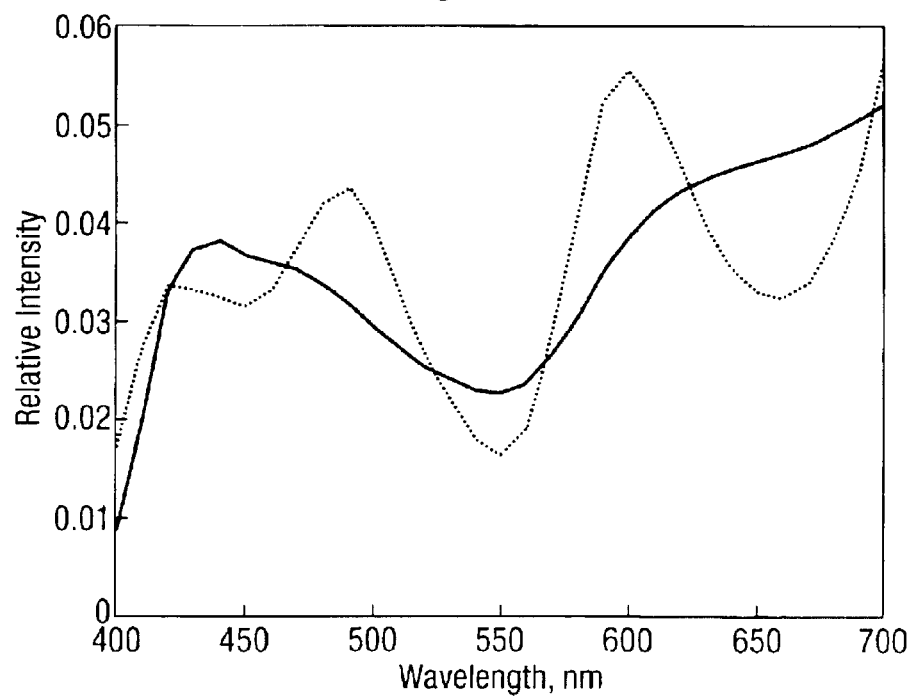
FIG. 19 illustrates the problem of scanner metamerism.

By using only three components, there is a possible problem with the scanner "metamerisum" in which two different spectra can actually produce identical R,G,B values. This is illustrated in FIG. 19 in which three principal components are used to construct two dissimilar spectra which each have identical R,G and B values. However, the X,Y,Z values produced using these two spectra would not necessarily be the same.

Similar comments apply if X,Y and Z values are used to generate the spectra.

This problem can be addressed by creating additional scanner "channels", both physical and theoretical, such as by using a greater number of colour filters, the combination of one or more filters with any or all of the existing colour filters, or indeed changing the light source., Of course, replacing the light, source or the three colour filters causes problems in that modifications to the scanner are needed.

However, it is possible to scan the medium a second time using an additional signal filter for all three R,G,B channels such that a different R,G,B data set is produced. It has been found that the use of such an additional filter can reduce the discrepancy between the spectra obtained from the medium and the corresponding spectra calculated from the component by a factor of three. Alternatively, a single extra channel can be added by placing a filter over one of the red, green or blue filters and in this case the improvement in the results has been found to be by a factor of around 2.5 depending upon the filter and paint set. An extra scan is still needed to be performed in this case although there is less data and processing required in comparison with using three additional channels.

It has been found that a range of different filters can be used to produce the one or more additional channels and one such example is that of a ramp filter in which the transmittance increases approximately linearly as a function of wavelength.

An increase in the accuracy of the reproduction of the constructed spectra can be achieved by using four values to represent the colour data, such as R,G,B,G'. One way of doing this is to scan a known spectrum with a scanner having a known response and generate R,G,B,G' values. The G' values correspond to those of the green filter overlaid with a ramp filter if two scans are used, one with and one without the additional ramp filter. A four channel input profile can then be generated using this information.

An analogous process can however be performed mathematically by considering the fact that there must be a relationship between the G and G' values as each G value has a corresponding G' value. Using this fact, a small number of "likely" constructed spectra are produced, each using the same R,G,B value, but varying the G' value for each. Knowledge of the type of filter used to produce G' (a ramp filter here) allows the values of G' to be generated. These likely spectra are then analysed to produce a single spectrum for each RGB value. A simple mean, median or modal average of the spectra can be used for this analysis.

Referring to FIG. 13, this additional step can be performed as part of the step of constructing the spectra from either the RGB or the XYZ/LAB values.

We claim:

1. A method of determining an image recording device characterisation for a target image, the method comprising:
   determining a number of component spectra from a set of target spectra obtained from the target image, such that the target spectra can be represented by combinations of one or more of the component spectra;
   defining a device data set representing a set of colours which can be generated by an image recording device, the device having a device spectral response;
   determining combinations of the component spectra which, in accordance with the device spectral response, correspond to the device data set;
   generating a perceptual colour space data set in accordance with the determined combinations of the component spectra; and,
   determining the characterisation by reference to a relationship between the device and perceptual colour space data sets.

2. A method according to claim 1, wherein the target image is obtained from a target medium.

3. A method according to claim 1, wherein the combinations of the component spectra are weighted combinations.

4. A method according to claim 1 wherein the component spectra are determined using principal component analysis.

5. A method according to claim 4, wherein the combinations are generated from three component spectra.

6. A method according to claim 1, wherein the device data set comprises RGB data.

7. A method according to claim 1, wherein the perceptual colour space data set comprises LAB or XYZ data.

8. A method according to claim 1, further comprising determining a white reference level for the device or perceptual colour space data set.

9. A method according to claim 8, wherein the white reference level is determined from the target image.

10. A method according to claim 1, wherein the target spectra are obtained from a number of locations within the target image.

11. A method according to claim 1, wherein one or more of the target spectrum, component spectra or device spectral response are represented as a set of discrete data.

12. A method according to claim 1, wherein for each colour represented in the device or perceptual colour space data sets, the method further comprises generating a set of candidate spectra using one or more additional variable parameters related to the corresponding colour data in the data set, and selecting or generating a resultant spectrum from the set of candidate spectra.

13. A method according to claim 12, wherein each colour in the data set is described using three colour values and wherein the variable parameter comprises a fourth value, related to one of the three values.

14. A method according to claim 12, wherein each colour in the data set is described using three colour values and wherein the variable parameters comprise a fourth, fifth and sixth value, each being related to the colour values.

15. A method according to claim 1, wherein the device spectral response is determined according to a method comprising:
   obtaining a filtered light response from a number of filters of a filter set, wherein each filter has a pass band with at least one boundary defined by a transition region, wherein in the wavelength region of interest, adjacent transition regions of the same sense are substantially non-overlapping;
   storing the obtained filtered light response for each filter as response data; and
   determining the device spectral response using the stored response data and separately determined data describing the spectral response of the number of filters.

16. A method according to claim 15, wherein the image recording device has a light detector and wherein the determined device spectral response includes a spectral contribution from the light detector.

17. A method according to claim 15, wherein the obtained response contains colour information.

18. A method according to claim 17, wherein separate device spectral responses are determined for one or more of a red, green or blue channel respectively.

19. A method according to claim 18, wherein the red or green or blue device spectral responses are produced using corresponding red, green or blue filters and wherein the device spectral responses include the spectral contributions from the said red, green or blue filters.

20. A method according to claim 15, wherein the step of determining the device spectral response comprises describing the spectral response of the number of filters of the filter set as a matrix, such that for each filter, the spectral response is described as a series of values across the spectrum and wherein the matrix is formed from the said discrete values for each filter of the number of filters.

21. A method according to claim 20, wherein the device spectral response is determined by multiplying the values representing the obtained response by the inverse matrix of the spectral response of the said filters.

22. A method according to claim 21, wherein the inverse matrix is determined using singular value decomposition.

23. A method according to claim 21, wherein the device spectral response is reconstructed using a selected number of Eigen vectors from the inverse matrix.

24. A method according to claim 23, wherein the selection of the Eigen vectors is based upon their contribution to the device spectral response.

25. A method according to claim 23, wherein the selection is based upon the order of the Eigen vectors.

26. A method according to claim 23, wherein the selection is based upon the magnitude of the Eigen vectors.

27. A method according to claim 15, wherein the device spectral response is determined using an iterative method.

28. A method according to claim 15, wherein the obtained response is determined by the total amount of light received over at least part of the spectrum.

29. A method according to claim 15, wherein the separately determined data describing the spectral response is obtained using a spectrophotometer.

30. A method according to claim 1, wherein the image recording device is a scanner and wherein the target image is obtained by scanning a target medium.

31. A method according to claim 30, wherein the scanner has a light source and wherein the determined device spectral response includes a spectral contribution from the scanner light source.

32. A method according to claim 30, wherein each of the number of filters of the filter set is scanned during a single scan.

33. A method according to claim 1, wherein the image recording device is a digital camera.

34. A method of determining an image recording device characterisation for a target image, the method comprising:

determining a number of component spectra from a set of target spectra obtained from the target image, such that the target spectra can be represented by combinations of one or more of the component spectra;

defining a perceptual colour space data set;

determining combinations of the component spectra which correspond to the perceptual colour space data set;

generating a device data set in accordance with the determined combinations of the component spectra and a device spectral response, the device data set representing a set of colours which can be generated by an image recording device having the device spectral response; and, determining the characterisation by reference to the relationship between the device and perceptual colour space data sets.

35. A method according to claim 34, wherein the target image is obtained from a target medium.

36. A method according to claim 34, wherein the combinations of the component spectra are weighted combinations.

37. A method according to claim 34 wherein the component spectra are determined using principal component analysis.

38. A method according to claim 37, wherein the combinations are generated from three component spectra.

39. A method according to claim 34, wherein the device data set comprises RGB data.

40. A method according to claim 34, wherein the perceptual colour space data set comprises LAB or XYZ data.

41. A method according to claim 34, further comprising determining a white reference level for the device or perceptual colour space data set.

42. A method according to claim 41, wherein the white reference level is determined from the target image.

43. A method according to claim 34, wherein the target spectra are obtained from a number of locations within the target image.

44. A method according to claim 34, wherein one or more of the target spectrum, component spectra or device spectral response are represented as a set of discrete data.

45. A method according to claim 34, wherein for each colour represented in the device or perceptual colour space data sets, the method further comprises generating a set of candidate spectra using one or more additional variable parameters related to the corresponding colour data in the data set, and selecting or generating a resultant spectrum from the set of candidate spectra.

46. A method according to claim 45, wherein each colour in the data set is described using three colour values and wherein the variable parameter comprises a fourth value, related to one of the three values.

47. A method according to claim 45, wherein each colour in the data set is described using three colour values and wherein the variable parameters comprise a fourth, fifth and sixth value, each being related to the colour values.

48. A method according to claim 34, wherein the device spectral response is determined according to a method comprising:

obtaining a filtered light response from a number of filters of a filter set, wherein each filter has a pass band with at least one boundary defined by a transition region, wherein in the wavelength region of interest, adjacent transition regions of the same sense are substantially non-overlapping;

storing the obtained filtered light response for each filter as response data; and determining the device spectral response using the stored response data and separately determined data describing the spectral response of the number of filters.

49. A method according to claim 48, wherein the image recording device has a light detector and wherein the determined device spectral response includes a spectral contribution from the light detector.

50. A method according to claim 48, wherein the obtained response contains colour information.

51. A method according to claim 50, wherein separate device spectral responses are determined for one or more of a red, green or blue channel respectively.

52. A method according to claim 51, wherein the red or green or blue device spectral responses are produced using corresponding red, green or blue filters and wherein the device spectral responses include the spectral contributions from the said red, green or blue filters.

53. A method according to claim 48, wherein the step of determining the device spectral response comprises describing the spectral response of the number of filters of the filter set as a matrix, such that for each filter, the spectral response is described as a series of values across the spectrum and wherein the matrix is formed from the said discrete values for each filter of the number of filters.

54. A method according to claim 53, wherein the device spectral response is determined by multiplying the values representing the obtained response by the inverse matrix of the spectral response of the said filters.

55. A method according to claim 54, wherein the inverse matrix is determined using singular value decomposition.

56. A method according to claim 54, wherein the device spectral response is reconstructed using a selected number of Eigen vectors from the inverse matrix.

57. A method according to claim 56, wherein the selection of the Eigen vectors is based upon their contribution to the device spectral response.

58. A method according to claim 56, wherein the selection is based upon the order of the Eigen vectors.

59. A method according to claim 56, wherein the selection is based upon the magnitude of the Eigen vectors.

60. A method according to claim 48, wherein the device spectral response is determined using an iterative method.

61. A method according to claim 48, wherein the obtained response is determined by the total amount of light received over at least part of the spectrum.

62. A method according to claim 48, wherein the separately determined data describing the spectral response is obtained using a spectrophotometer.

63. A method according to claim 34, wherein the image recording device is a scanner and wherein the target image is obtained by scanning a target medium.

64. A method according to claim 63, wherein the scanner has a light source and wherein the determined device spectral response includes a spectral contribution from the scanner light source.

65. A method according to claim 63, wherein each of the number of filters of the filter set is scanned during a single scan.

66. A method according to claim 34, wherein the image recording device is a digital camera.

* * * * *